July 7, 1942.  H. I. KALLMANN ET AL  2,288,718
DEVICE FOR MEASURING THE INTENSITY OF A RADIATION OF SLOW
NEUTRONS BY MEANS OF IONIZATION CHAMBER
Filed Jan. 31, 1940
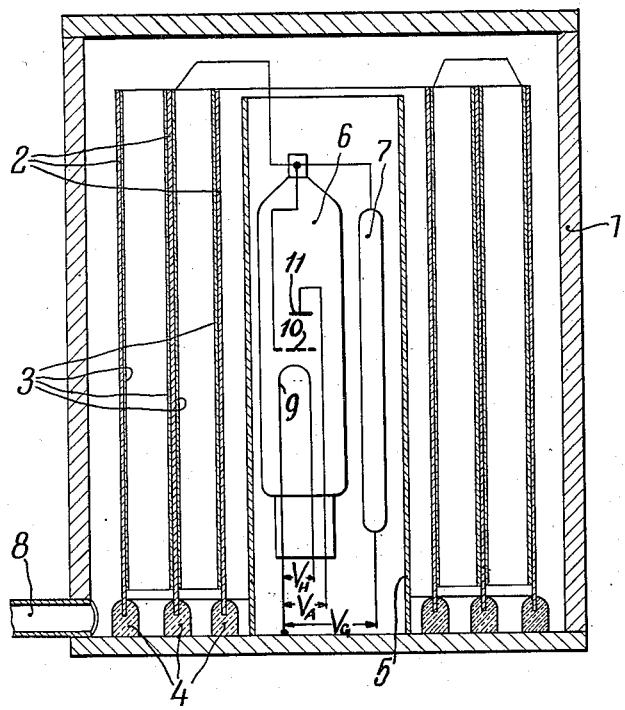

Patented July 7, 1942

2,288,718

UNITED STATES PATENT OFFICE 2,288,718

DEVICE FOR MEASURING THE INTENSITY OF A RADIATION OF SLOW NEUTRONS BY MEANS OF IONIZATION CHAMBER

Hartmut Israel Kallmann, Berlin-Charlottenburg, and Ernst Kuhn, Berlin, Germany, assignors to I. G. Farbenindustrie Aktiengesellschaft, Frankfort-on-the-Main, Germany, a corporation of Germany Application January 31, 1940, Serial No. 316,699
In Germany March 25, 1939

6 Claims. (Cl. 250—83.6)

The present invention relates to devices for measuring the intensity of a radiation of slow neutrons by means of an ionisation chamber.

In working with neutrons, the neutrons have usually been produced by using radio-active substances, for example radium, radium emanation, or the like. Recently, it has been shown that neutrons can also be conveniently produced in an equally or even greater intensity by the disintegration of atoms by means of rapidly-moving ions. A disadvantage of this method is that the neutron intensity fluctuates in a manner which can not be closely controlled. These fluctuations may be attributed to fluctuations in the ion stream, non-uniformities in the bombarded layer, and so on. It is therefore necessary in the ion method of producing neutrons, to measure the intensity continuously. Hitherto this has been effected by counting the neutrons by recording the action of a single neutron. This counting of the neutrons is tedious and requires an apparatus which is well protected against electrical disturbances.

Therefore it has been already suggested to measure the intensity of slowly moving neutrons with the aid of ionization chambers the current of which directly indicates the intensity of the neutron radiation on a measuring instrument. In order to measure the intensity of neutrons which do not ionize by themselves a known intermediate reaction is employed in the course of which strongly ionizing particles are produced by the neutrons. For example the known reactions $n_0^1 + B_5^{10} = Li_3^7 + He_2^4$ or $n_0^1 + Li_3^6 = H_1^3 + He_2^4$ may be used.

In the lithium, or lithium compounds respectively, existing in nature the contents of $Li_3^6$, active in said reaction, amounts to only about 10%, and in the boron, or boron compounds respectively, the contents of $B_5^{10}$, active in said reaction, amounts only to about 20%. The main mass of these elements consists, however, of $Li_3^7$, or $B_5^{11}$ respectively, which do not react in the above mentioned manner.

It is not necessary to choose always as intermediate process a reaction in which heavy, strongly-ionizing particles are produced under the action of slow neutrons. Although these intermediate reactions often bring about the highest ionization current it may under circumstances be advantageous to choose another kind of intermediate reaction in which electrons (+ and −) or gamma rays are produced under the action of slow neutrons; these electrons or gamma rays produce in the chambers an ionization current which indicates the neutron intensity. The atomic nuclei emitting heavy particles or electrons or gamma rays under the action of the slow neutrons react differently strongly with slow neutrons of different velocity. Thus in order to measure chiefly the neutrons of a definite range of velocity, it is suitable to select such an intermediate reaction in which chiefly the neutrons of the desired range of velocity cause the emission of the ionizing particles or gamma rays. For neutrons of a definite range of velocity an intermediate reaction in the course of which electrons or gamma rays are produced may be more effective, thán an intermediate reaction which takes place under emission of heavy particles. Thus, cadmium which has been enriched in the effective isotope may be used as or in the neutron reactive layer.

The emission of electrons or gamma rays need not take place immediately after the reaction with the neutron, but may take place some time thereafter. When employing these radio-active reactions the measurement of the intensity should be delayed until the radio active equilibrium has been sufficiently attained.

In many cases of these intermediate reactions the different isotopes of the element used react differently strongly with the neutrons. That sort of the isotope which reacts most strongly with the neutrons or which reacts particularly strongly with neutrons of the range of velocity to be measured will be named the effective sort.

It is an object of the present invention to increase the sensitiveness of the suggested device for measuring the intensity of a radiation of slow neutrons. This inventive object is attained by an ionization chamber the electrodes of which are not covered with an element or compound thereof existing per se in nature, but with an element, or compound thereof artificially enriched with the effective isotope beyond that proportion which corresponds to the natural distribution of this isotope in the element used. The enrichment may be accomplished by any of the known methods for separating or concentrating isotopes, i. e. diffusion, mass spectrograph, electrolysis or chemical processes.

With a given intensity of the neutron radiation the number of particles producing the ionization in the chamber will be the larger the larger the content of the effective sort of isotope is in the layer from which heavy particles or electrons or gamma rays are emitted under the action of the neutrons.

Thus an ionization chamber the electrodes of which are covered with a neutron-reactive element in which the effective isotope is enriched, supplies a greater ionization current than a chamber the electrodes of which are covered with a similar neutron-reactive element but without enrichment of the effective isotope. There is employed, for instance, a layer enriched with $Li_3^6$, or with $B_5^{10}$ respectively. But also compounds of these isotopes or mixtures thereof may be used.

If the substance supplied to the electrodes does not adhere on them as is the case, for instance, with amorphous boron, it is suitable to cover the electrodes with a thin covering consisting, for instance, of paper or to apply said substance with the aid of a binder.

If the substance supplied to the electrodes is likely to be affected by air or by moisture, as is the case, for instance, with lithium, it is suitable either to protect said layer by means of a covering absorbing the heavy particles only very slightly, or to make use of an ionization chamber filled, for instance, with a rare gas and being free from such gases or vapors as are likely to affect said substance.

The slow neutrons liberate from the layer of lithium or boron heavy particles which produce ions in the gas of the ionization chamber. The current of ions thus produced indicates the intensity of the neutron radiation. As only a comparatively thin reaction layer, for instance, a layer of lithium or boron, is effective, only a small fraction of the traversing neutrons will liberate heavy particles. In order to produce an ionization as strong as possible with a given neutron radiation it is suitable to provide a plurality of layers one behind the other. Analogous arrangements may be used with layers emitting electrons or gamma rays.

The accompanying drawing is a representation of an embodiment of the invention and shows a vertical section through the device. It is assumed in this example that the reaction layer consists of boron and is enriched with $B_5^{10}$ beyond the proportion of its natural distribution in boron.

In the figure 1 denotes a casing consisting of iron or of lead for protection against Röntgen-rays and gamma rays issuing from the source of neutrons. The casing 1 may, for instance, be cylindrical. Within it are provided several cylinders 2 consisting of aluminium and supported by amber insulators 4. The cylinders 2 are covered with layers of paper 3 onto which the boron enriched with $B_5^{10}$ has been applied. In view of its bad electric conductivity, the boron may be covered with a metal grid whereby at the same time a good electric field distribution is attained. In the center of the casing 1 are arranged an electrometer tube 6 and a high ohmic leakage resistance 7. These members 6 and 7 are surrounded with an earthed metallic cylinder 5 protecting said members against electric fields. The cathode 9 of the electrometer tube is earthed and heated by the potential $V_H$. The grid 10 of the tube and the cylinders connected with it are kept on a potential $V_G$ of about −2 or −3 volts against earth. The anode 11 lies on the potential $V_A$ of about 6 volts. The other cylinders lie on a positive potential of some hundred volts. The voltages are supplied by wires, not shown, leading through tube 8. In order to obtain a small arrangement, the distances between the electrodes is preferably so chosen as to correspond with the range of the particles within the gas filling the ionization chamber. In order to decrease the distance between the electrodes the range of the particles may be reduced by filling the ionization chamber with a heavy gas or with a gas of high pressure.

The device according to the invention operates as follows: The device is placed into the neutron beam to be measured. The neutrons penetrate the casing practically without being absorbed and impinge upon the aluminium cylinders 2 which are covered with boron where the above-mentioned reaction takes place. There they liberate alpha particles which ionize the gas, for instance, air under atmospheric pressure in the ionization chamber. The ions produced are collected to the grid of the electrometer tube 6. Outside of the casing 1 are provided a galvanometer, an anode battery and the heating battery (these three members are not shown in the drawing). The intensity of the neutron radiation is indicated by the deflection of the galvanometer hand. The neutronic device may be calibrated in a simple fashion by means of a known source of neutrons. Care should be taken to see that the distance between the device and the source of neutrons during the calibration is the same as during the actual measurements.

Another advantage of the device according to this invention is that if the sort of isotopes employed for the intermediate reaction is appropriately selected one succeeds in making the sensitiveness for slow neutrons of a definite range of velocity particularly high if, namely, as reaction layer an element, or a suitable compound thereof, is chosen in which that sort of isotopes which selectively strongly reacts with neutrons of a definite range of velocity is enriched compared with the natural distribution of the isotopes in the element used. The ionization chamber will be particularly suited for measuring the intensity of the slow neutrons of this definite range of velocity.

We claim:

1. A device for measuring the intensity of a radiation of slow neutrons by means of an ionization chamber, which comprises electrodes provided with a neutron-reactive layer containing a neutron-reactive element which emits a radiation under the action of impinging slow neutrons said neutron-reactive element being enriched with a neutron-reactive isotope thereof in an amount greater than the proportion of its natural distribution in said neutron-reactive element.

2. A device for measuring the intensity of a radiation of slow neutrons by means of an ionization chamber, which comprises electrodes provided with a neutron-reactive layer containing a neutron-reactive element which emits a radiation of ionizing particles under the action of impinging slow neutrons said neutron-reactive element being enriched with a neutron-reactive isotope thereof in an amount greater than the proportion of its natural distribution in said neutron-reactive element.

3. The device defined in claim 2, in which the neutron-reactive layer contains as neutron-reactive element lithium which is enriched with $Li_3^6$ in an amount greater than its natural distribution in lithium.

4. The device defined in claim 2, in which the neutron-reactive layer contains as neutron-reactive element boron which is enriched with $B_5^{10}$ in an amount greater than its natural distribution in boron.

5. A device as defined in claim 1 in which the radiation is gamma radiation.

6. A device as defined in claim 1 in which the neutron-reactive element is cadmium.

HARTMUT ISRAEL KALLMANN.
ERNST KUHN.